Oct. 22, 1935.     S. P. MILLER     2,018,377
METHOD AND APPARATUS FOR DEHYDRATING AND DISTILLING TAR
Original Filed March 24, 1927     4 Sheets-Sheet 1

INVENTOR
Stuart Parmelee Miller
BY
Pennie Davis Marvin & Edmonds
ATTORNEYS

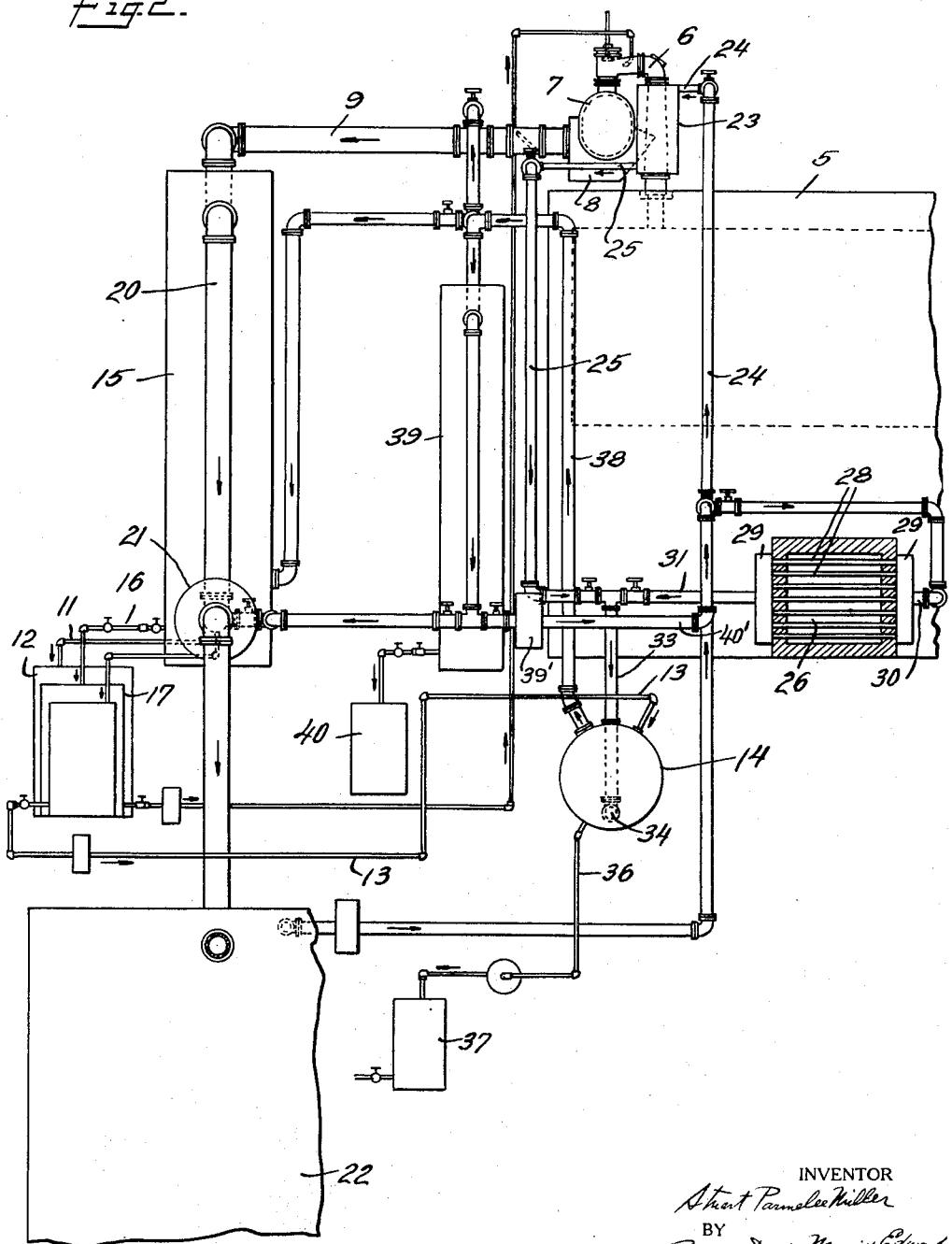

Oct. 22, 1935.  S. P. MILLER  2,018,377
METHOD AND APPARATUS FOR DEHYDRATING AND DISTILLING TAR
Original Filed March 24, 1927  4 Sheets-Sheet 3
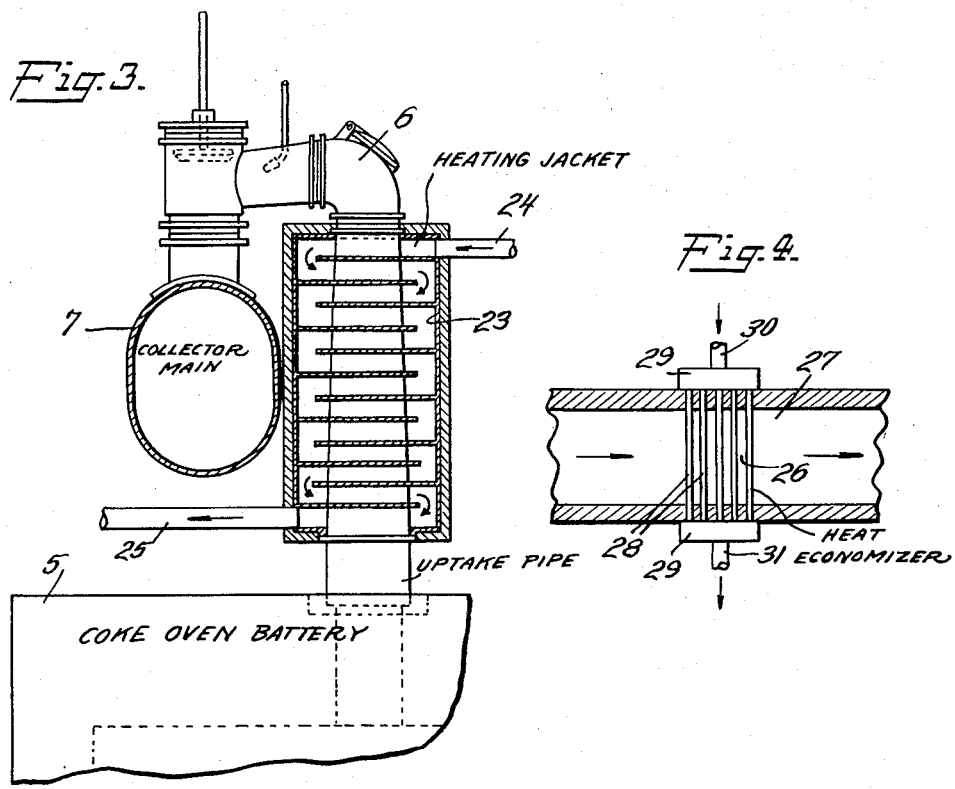
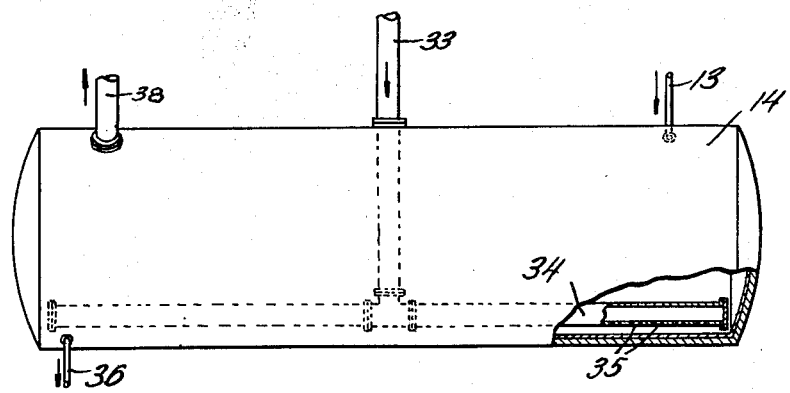
INVENTOR
BY
ATTORNEYS Patented Oct. 22, 1935

2,018,377

UNITED STATES PATENT OFFICE 2,018,377

METHOD AND APPARATUS FOR DEHYDRATING AND DISTILLING TAR

Stuart Parmelee Miller, Scarsdale, N. Y., assignor to The Barrett Company, New York, N. Y., a corporation of New Jersey Application March 24, 1927, Serial No. 177,862
Renewed November 15, 1933

5 Claims. (Cl. 202—30)

This invention relates to improvements in the dehydration and distillation of tar and includes a new method of dehydration and distillation as well as an improved apparatus therefor.

In the distillation of coal in coke ovens, etc. the coal-distillation gases carrying the tar are commonly sprayed with ammonia liquor or a mixture of ammonia liquor and tar to cool the gases and separate the tar therefrom. The separated tar is admixed with ammonia liquor and even after standing to permit as much as possible of the ammonia liquor to separate therefrom may contain a considerable amount of water intimately mixed therewith. Long settling will in some cases reduce the water content to approximately two per cent. Often, however, the water is emulsified and even long settling with moderate heating does not effect separation. In such a case tar may contain as high as fifteen to twenty per cent. of water. Other tars, such as tar produced at gas-retort plants (vertical, horizontal or inclined), water-gas tar, etc., frequently contain a considerable percentage of water intimately admixed or combined therewith, particularly where water or ammonia liquor is employed for separating and condensing the tar constituents from the coal distillation or other gases.

When tar containing water is shipped from the coke-oven or other coal-distillation plant to the tar-distillation plant, the water content of the tar adds materially to the cost of transportation and subsequent treatment of the tar. When such water-containing tar is subjected to dehydration in ordinary stills trouble from foaming is frequently met with even though the tar is slowly and gradually heated in the still. Separate dehydrators which are sometimes used at tar-distillation plants increase the cost of distillation.

The present invention provides an improved method and apparatus for dehydrating tar or for dehydrating and distilling tar whereby the dehydration or dehydration and distillation are effected by means of waste heat, produced by the coal-distillation operation, which is otherwise lost in the ordinary operation of coke ovens and the like.

Two sources of waste heat are available in the operation of a coke oven. The coke-oven gases resulting from the distillation of the coal leave the ovens at a relatively high temperature, for example, around 600° or 700° C. or even higher in some cases. This heat can be utilized by transferring a substantial portion thereof to a suitable gas such, for example, as the fuel gas resulting from the coal distillation operation after removal of most or all of the condensable constituents therefrom. Other gases, such as air, stack gases, etc., can be used. The fuel gas has an advantage for the purpose described in that it contains only the non-condensable constituents of the coke-oven gases and it can be returned, therefore, after utilization for the dehydration or dehydration and distillation of the tar, to the ordinary condensing system to recover any volatile products which are separated from the tar.

Another source of available heat is in the waste gases from the stack, i. e., flue gases. The coke ovens are heated by the combustion of fuel gases in flues arranged in the walls of the ovens and the products of combustion leave the flues at very high temperatures consistent with the temperatures which must be maintained in the ovens to effect the distillation of coal. A portion of the heat in the waste gases is recovered in regenerators or recuperators which heat the incoming fuel gas and the air employed in burning the fuel gas. The waste gases arrive at the stack still at comparatively high temperature, e. g., 300° C. and the heat therein is ordinarily dissipated in the atmosphere. By the use of a suitable heat exchanger or economizer in or adjacent the stack, a substantial portion of the heat in the waste gases can be transferred to a suitable gas such as the fuel gas, air, etc., heretofore mentioned and the latter, after heating, can be utilized for the dehydration or dehydration and distillation of tar. A fuel gas or other heat transfer or carrier gas may thus be heated substantially to the temperature of the waste fuel gas and can be brought into contact with the tar to dehydrate it or distill it while the carrier gas is at this high temperature, or considerably lower gas temperatures may be employed, as will be hereinafter more fully described. When the carrier gas is heated by the fresh hot coal distillation gases, its temperature may be raised to considerably above 300° C. and even approaching that of the coal distillation gases, say 600–700° C.

In carrying out the dehydration or dehydration and distillation according to the present invention the gas, such as fuel gas heated as hereinbefore described, is brought into heat-interchanging relation with the tar to be dehydrated and distilled either directly or indirectly but preferably into direct and intimate contact with the tar. This intimate contact of the tar and hot gases can be effected in various ways and the dehydration and distillation of the tar can be carried out either as a batch or as a continuous operation. The tar to be dehydrated can, for example, be atomized or sprayed into a current of hot gas, thereby bringing the tar particles into intimate contact with the hot gas and heating the tar particles to a sufficient temperature to dehydrate or dehydrate and partially distill the tar. Instead of spraying or atomizing the tar into a current of the hot gas a current of gas may be forced through a body of the tar to be dehydrated, thereby heating and agitating the body of tar and effecting dehydration and partial distillation of the lighter oil constituents therefrom, which constituents are carried away by the escaping gases. The dehydration and distillation can be effected also in countercurrent manner, for example, by causing the tar to be dehydrated to flow downwardly through a baffle tower or other apparatus in which the hot gases flow upwardly so that the downwardly flowing tar is progressively heated and dehydrated and distilled. Or the hot gases may be passed over the surface of a body of tar, for instance, in a closed tank. In the latter case it will be desirable to agitate the body of tar so as to keep fresh surfaces of the tar exposed to the gases.

Depending upon the extent to which the distillation of the tar is carried, substantially only the light oils may be removed with the water and free ammonia from the tar or by heating to a high temperature heavier oils can be driven off. If, for example, the tar is heated during the dehydration and distillation only to about 130° C., only the lighter oils will be driven off therefrom during the dehydration and distillation while if the tar is heated to a higher temperature heavier oil constituents will be driven off also and will be carried away by the hot distillation gases and can be subsequently condensed and recovered therefrom.

For certain purposes dehydrated tar containing 0.5% to 1% of water is entirely satisfactory. The production of such tar may be accomplished at relatively low gas temperatures, for example, approximately 125° C. or lower. If a tar containing no more than traces of water is desired, it will be found expedient to work with gases at higher temperatures, for example, approximately 160° to 170° C. or to increase the volume of lower temperature gas supplied per unit of tar to be treated. Distillation as well as dehydration will be effected accordingly and the dehydrated tar will be a heavier tar, that is, it will contain less light oil, will be more viscous and will have a higher specific gravity. If a more fluid tar is desired some of the oil distilled therefrom may after recovery thereof from the gas be freed from water and returned to the tar.

The gases escaping from the dehydrating and distilling operation will carry in vapor form the water removed from the tar during the dehydration as well as the ammonia and oils driven off from the tar during the distillation. The gases can be treated for the condensation and recovery of the vapor constituents therefrom in a separate recovery system so that the oils condensed therefrom will be those resulting from the distillation of the tar or the gases can be delivered to the ordinary condensing system connected to the coke oven for condensation with the coke-oven gases. After condensation of the vapors the gases can be disposed of in any desirable way. For example, if fuel gases are used for dehydrating, these gases may be delivered to the gasometer for further use. If air is employed for dehydrating the residual gas can be discharged to the atmosphere.

Alternatively, the gas used for dehydrating can be circulated in a closed cycle in which it is heated, used to dehydrate or to dehydrate and distill tar, cooled to separate condensable constituents and returned for further heating.

The amount of heat required for the dehydration or dehydration and distillation of tar will depend upon the amount of tar available for such treatment, the proportion of water carried by the tar, and the extent to which the dehydration or dehydration and distillation of such tar is to be carried. If only the tar produced by a single coke-oven battery is to be dehydrated the amount of heat required will be only a small proportion of the heat available either in the coke-oven gases or in the stack gases. If tar from other sources is to be dehydrated or dehydrated and distilled a larger proportion of the available heat can be utilized. The equipment required for the transfer of heat either from the coke-oven gases or from the waste stack gases can be designed to recover therefrom the amount of heat which can be utilized effectively for the dehydration or dehydration and distillation of tar. It can be designed likewise to permit more or less heat to be recovered so that more or less tar can be dehydrated or dehydrated and distilled. Similarly the heat exchangers can be regulated so that the temperature of the gases employed for dehydration or dehydration and distillation may be varied to provide the necessary heating conditions for the accomplishment of the desired purpose.

The present invention permits the production of dehydrated tar or tar which has been both dehydrated and distilled to a greater or less extent to remove oil constituents therefrom. Where the tar is desired in a dehydrated condition but still containing the greater part of its oil constituents, the dehydration need be carried only to the point necessary to remove all or practically all of the water contained therein together with such light oils as are removed at the same temperature. Where, however, a heavier tar is desired the distillation can be carried further until more of the light oils are removed to give a tar suitable, for example, for use as a road tar for surfacing roads, etc. By continuing the distillation a heavier tar or even a pitch can be produced.

Where the tar is to be separately distilled in a separate still or distillation system, the dehydrating process of the present invention can advantageously be carried out as a preliminary operation to give a dehydrated and preheated tar. If the further distillation is carried out at the same plant at which the tar is produced and dehydrated, the hot dehydrated tar can be conveyed directly to the distillation system and subjected to distillation therein. The preliminary dehydration of the tar reduces materially the hazard of the distilling operation, for example, by reducing foam troubles and it increases the effective capacity of the distillation unit.

Where the dehydration and distillation are carried out as a batch operation, for example, by forcing the hot gases through a body of tar to be dehydrated, the tar will be progressively heated by the hot gases and the water and lighter oils will be progressively removed therefrom until the dehydration and distillation have been carried to the desired point. Thereafter the operation can be discontinued, the dehydrated and distilled tar can be withdrawn and the still can be recharged with tar to be dehydrated. In the case of continuous dehydration and distillation the operation can be regulated by varying the time of contact of the tar and gases or the intimacy of contact or the temperature of the gases or the amount of the gases so that the desired degree of dehydration and distillation can be effected.

The invention will be further described in connection with the accompanying drawings illustrating several forms of apparatus embodying the invention and adapted for the practice of the process, but it is intended and will be understood that the invention is illustrated thereby but is not limited thereto.

In the accompanying drawings, Fig. 1 is a plan view of a portion of a coke-oven plant;

Fig. 2 is an elevation thereof;

Fig. 3 is an enlarged section of an uptake pipe showing a jacket for heating the gases used for dehydrating tar;

Fig. 4 is an enlarged section illustrating an economizer to permit heating of the dehydrating gases by the waste heat in the stack gases;

Fig. 5 is an enlarged sectional view of a tar still such as that shown in Figs. 1 and 2;

Figure 1:
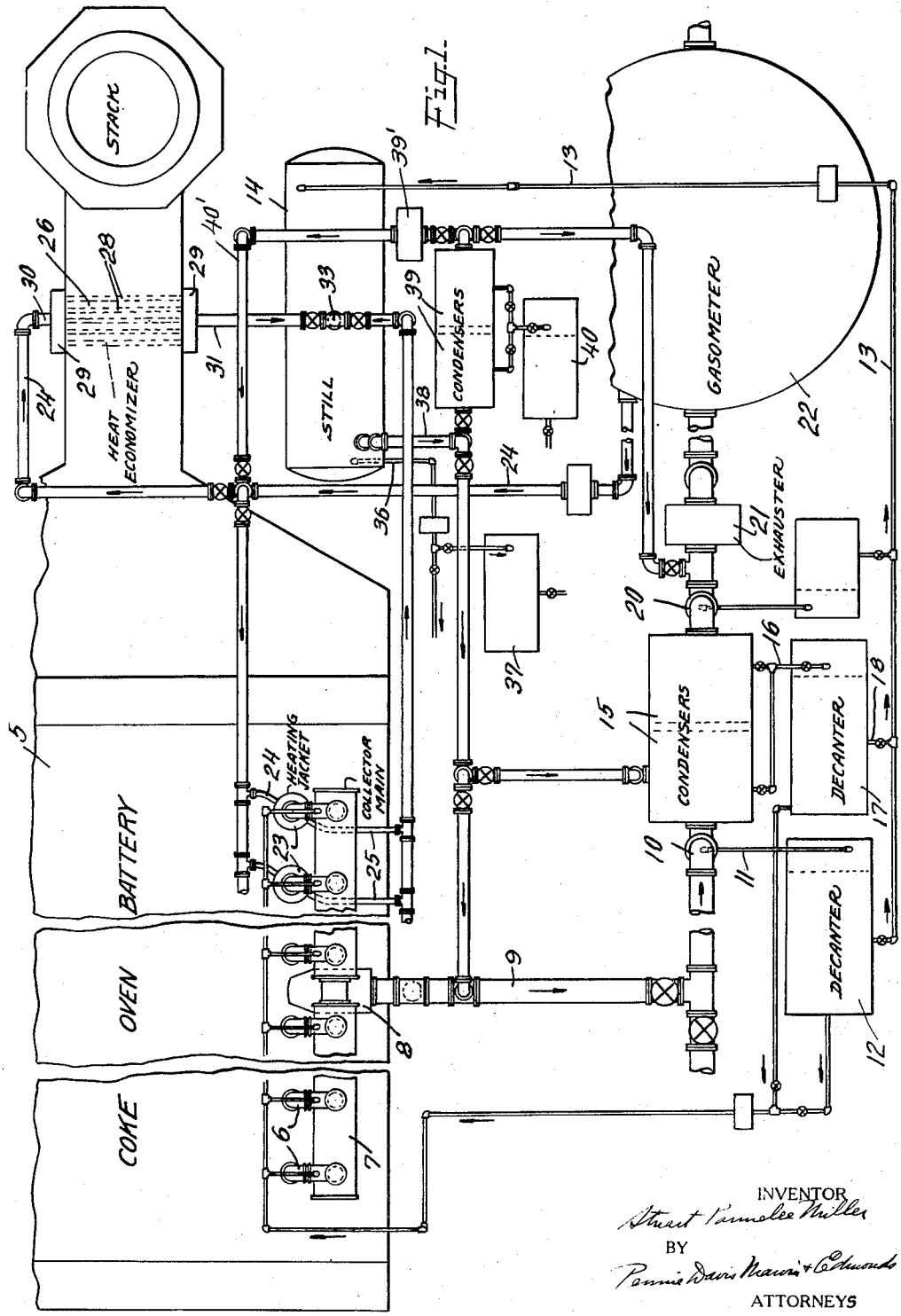

Referring to Figs. 1 and 2 of the drawings, 5 indicates a coke-oven battery in which the ovens are connected by uptake pipes and goose-necks 6 to a common collector main 7 which communicates through a centre box 8 with a cross-over main 9. In the operation of the battery the gases produced in the ovens pass through the uptake pipes and goose-necks to the collector main and are subjected therein to sprays of ammonia liquor or tar and ammonia liquor for the purpose of rapidly reducing the temperature of the gases. The gases and the condensed constituents pass through the cross-over main and the condensed constituents accumulate in a tar separator 10 and pass through a pipe 11 to a decanter 12 wherein the tar is separated from the ammonia liquor. The tar may be delivered through a pipe 13 to a dehydrator 14 hereinafter more fully described. The balance of the gases pass through condensers 15, wherein the oils are condensed and separated. The mixture of ammonia liquor and oils from the condensers are delivered through pipes 16 to a decanter 17 wherein the oils are separated from the ammonia liquor. The oils may be delivered through a pipe 18 to the dehydrator 14. The ammonia liquor separated in the decanters 12 and 17 may be returned to the collector main or otherwise utilized. The gases from the condensers 15 pass through a tar separator 20 to an exhauster 21 which maintains a suitable pressure balance in the system and ensures the movement of the gases therethrough. From the exhauster 21 the gases pass through the ammonia and light oil recovery system (not shown) to remove therefrom substantially all traces of condensable constituents and are delivered finally to a gasometer 22. The apparatus hereinbefore described, including the final extractors and coolers, form a part of the ordinary coke-oven condensing system. The fuel gas which accumulates in the gasometer 22 may be utilized for any desired purpose, for example, as a fuel for heating the coke ovens by combustion in the flues thereof. In accordance with the present invention a portion of the fuel gases is utilized in dehydrating or dehydrating and distilling the tar. Since the gases arrive at the gasometer at substantially atmospheric temperature, it is necessary to supply them with the heat necessary for dehydrating or dehydrating and distilling tar.

The heating of the fuel gases may be accomplished effectively by passing such gases through jackets surrounding the uptake pipes of the ovens. As illustrated more particularly in Fig. 3 of the drawings, a suitable number of the uptake pipes leading from the ovens may be surrounded by insulated jackets 23 forming a space surrounding the uptake pipes through which the gas to be heated may flow. This gas may be delivered from the gasometer 22 by an exhauster through a pipe 24 and after circulating through the space within the jackets may be withdrawn through a pipe 25. As previously indicated, the temperature of the coke-oven gases in the uptake pipes may be in the neighborhood of 600° to 700° C. and consequently the fuel gases can be heated in the jackets to a relatively high temperature by the transfer of heat from the coke-oven gases. The gases thus heated may be utilized for dehydrating or dehydrating and distilling the tar as hereinafter described.

In Fig. 4 of the drawings I have illustrated the application of an economizer 26 which may be disposed in a suitable chamber 27 at the base of the stack and may comprise a plurality of tubes 28 connected to suitable headers 29 to permit the passage of the fuel gases through the tubes. Since the waste gases arrive at the stack still at a relatively elevated temperature, the fuel gases may be heated materially by passage through the economizer, particularly in view of the enormous amount of flue gas available. An inlet pipe 30 may deliver the gases from the gasometer 22 to the economizer and after being heated the gases may be discharged through a pipe 31 to the dehydrator as hereinafter described.

Referring to Fig. 5 of the drawings, the still 14 may be cylindrical in form. The heated fuel gases may be introduced through a pipe 33 to a pipe 34 at the bottom of the still having a plurality of openings 35 therein to permit the escape of the gases into the body of tar whereby the latter is agitated and at the same time subjected to the direct heating effect of the gases. The intimate contact of the hot gases with the tar results in removal of the water therein contained together with more or less of the light oils depending upon the temperature of the gases and other factors governing the transfer of heat to the tar. The dehydrated tar can be withdrawn through a pipe 36 and delivered to a suitable receptacle 37 or it may be pumped directly to other apparatus (not shown) wherein further distillation is effected.

The gases escaping from the dehydrator 14 carry therewith the water and volatile oils. Preferably these gases are delivered to the cross-over main 9 of the coke-oven condensing system and mingled with the gases from the coke ovens, being subjected therewith to condensation and the further treatment to which these gases are normally subjected. The gases from the dehydrator 14 may, instead of being delivered to the cross-over main, pass into any of the condensers or coolers in the coke-oven gas condensing system in order to separate the water and oil content of these gases which eventually are delivered to the gasometer 22.

Alternatively, the gases from the dehydrator 14 can be subjected to separate condensation by delivery through a pipe 38 to condensers 39, wherein the water and oils are condensed and separated. A decanter 40 may be connected to the condensers to permit recovery of the oil from the water. The gas from which the condensable constituents have been removed can be returned to the economizer through a pipe 40' with the aid of exhauster 39'.

Figure 6:
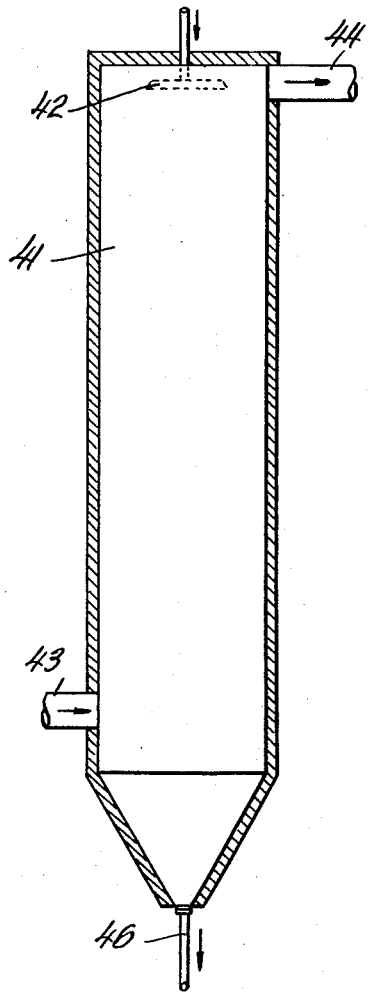
Fig. 6 is a similar view of another form of tar still.

Referring to Fig. 6 of the drawings, instead of the cylindrical still or dehydrator a column 41 may be provided to which the tar is introduced through a plurality of nozzles 42. The heated dehydrating gases can be introduced at the bottom of this column through a pipe 43 and pass upwardly therein in intimate contact with the descending tar which is introduced in the form of a spray by the spray nozzles. The tar is thus dehydrated or dehydrated and distilled and the gases carrying the volatile products escape through a pipe 44 to the condensing system as hereinbefore described. The dehydrated tar can be withdrawn from the bottom of the column through a pipe 46.

Figure 7:
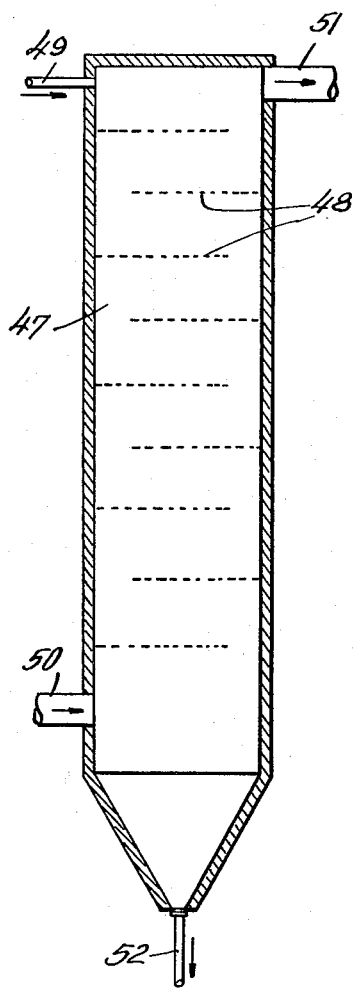
Fig. 7 is a sectional view of another type of still.

In Fig. 7 of the drawings, another apparatus is illustrated comprising a column 47 having a plurality of baffles 48 therein. The tar to be dehydrated is introduced at the top of the column through a pipe 49 and flows downwardly over the baffles in contact with the heated dehydrating gases which enter through a pipe 50 at the bottom of the tower. The gases carrying the volatile products escape through a pipe 51 at the top of the column to the condensing system as hereinbefore described. The dehydrated tar can be withdrawn through a pipe 52 at the bottom of the tower.

In a similar manner gas-house tar can be dehydrated or dehydrated and distilled by means of gaseous products reheated by waste heat in the system and water-gas tar can be similarly treated. The invention is thus of more or less general application to the dehydration of tar by means of waste heat in a coal-distillation system.

Instead of dehydrating tar, tarry oils or clean oils can be similarly dehydrated, for example, oils such as are produced in the different condensers of a by-product recovery system where ammonia liquor is employed for throwing down the oils. By subjecting such oils to dehydration in this way dehydrated oils can be produced directly at a by-product coke-oven plant without the expenditure of fuel for heating and dehydration and with utilization of the heat contained in the hot coke-oven gases or flue gases which is commonly wasted.

Various changes can be made in the details of operation and apparatus as described without departing from the invention or sacrificing any of the advantages thereof.

I claim:—

1. The method of dehydrating tar and of recovering oils vaporized during the dehydration, which comprises cooling fresh hot coal distillation gases to separate tar therefrom, reheating the cooled gases and passing them into direct contact with water-containing-tar to heat the tar and vaporize the water therefrom and admixing the resulting gases with fresh coal distillation gases, then passing the admixed gases to a light oil absorber of a by-product recovery system thereby recovering with light oil from the coal distillation gases any light oil vapor distilled from the tar during the dehydration.

2. In combination with a coal distillation plant a condenser, a light oil absorber, a still, a heat interchanger, means for passing gases from the coal distilling apparatus through the condenser and then to the light oil absorber, means for passing at least a portion of the gases leaving the condenser to the heat interchanger and from there to the still, and then returning them to the means for passing gases from the condenser to the light oil absorber.

3. In combination with coal distilling apparatus, a condenser, a still for dehydrating tar, a heat interchanger, means for passing coal distillation gases from the coal distilling apparatus through the heat interchanger to the condenser, means for passing other gases into the heat interchanger to be brought into indirect contact with the hot coal distillation gases passing therethrough and means for passing these heated gases to the still.

4. In combination with coal distilling apparatus a stack, a heat interchanger, means for passing waste combustion gases used for heating the coal distilling apparatus first to the heat interchanger and then to the stack, a still, means for passing other gases into the heat interchanger and bringing them into indirect heat interchange relation with the waste combustion gases therein, and means for then bringing the gases thus heated into direct contact with tar in the still.

5. The method of dehydrating tar and of recovering oils vaporized during the dehydration which comprises cooling fresh hot coal distillation gases to separate tar therefrom, dividing the cooled gases into at least two portions, reheating one portion of the gases, bringing water-containing-tar into contact with the heated gases so as to heat the tar and vaporize water therefrom, admixing the resulting gases and vapors with another portion of the cooled distillation gases and then passing the resulting admixed gases to a light oil absorber so as to recover from the gases light oil originally present in the coal distillation gases together with light oil vapor distilled from the tar during the dehydration.

STUART PARMELEE MILLER.